US010974684B2

(12) United States Patent
Enders

(10) Patent No.: US 10,974,684 B2
(45) Date of Patent: Apr. 13, 2021

(54) MULTI-CHAMBERED DRIVER-SIDE AIRBAG ASSEMBLIES

(71) Applicant: Autoliv ASP, Inc., Ogden, UT (US)

(72) Inventor: Mark L. Enders, Pleasant View, UT (US)

(73) Assignee: Autoliv ASP, Inc., Ogden, UT (US)

(*) Notice: Subject to any disclaimer, the term of this patent is extended or adjusted under 35 U.S.C. 154(b) by 77 days.

(21) Appl. No.: 16/290,370

(22) Filed: Mar. 1, 2019

(65) Prior Publication Data

US 2020/0276953 A1 Sep. 3, 2020

(51) Int. Cl.
*B60R 21/233* (2006.01)
*B60R 21/206* (2011.01)
*B60R 21/2338* (2011.01)
*B60R 21/16* (2006.01)
(Continued)

(52) U.S. Cl.
CPC .......... *B60R 21/233* (2013.01); *B60R 21/206* (2013.01); *B60R 21/2338* (2013.01); *B60R 2021/0051* (2013.01); *B60R 2021/161* (2013.01); *B60R 2021/23107* (2013.01); *B60R 2021/23169* (2013.01);
(Continued)

(58) Field of Classification Search
CPC ... B60R 21/203; B60R 21/206; B60R 21/233; B60R 21/2338; B60R 2021/0051; B60R 2021/0053; B60R 2021/161; B60R 2021/23107; B60R 2021/23169; B60R 2021/23308; B60R 2021/23324; B60R 2021/23382
See application file for complete search history.

(56) References Cited

U.S. PATENT DOCUMENTS 6,715,789 B2* 4/2004 Takimoto .............. B60R 21/206
280/730.1
6,752,417 B2* 6/2004 Takimoto .............. B60R 21/206
280/730.1
(Continued)

FOREIGN PATENT DOCUMENTS

CN 104742849 B 8/2017
JP 2008114703 A 5/2008

OTHER PUBLICATIONS

Machine translation of CN104742849B (5 pgs).
Machine translation of JP2008114703 (5 pgs).

*Primary Examiner* — Laura Freedman
(74) *Attorney, Agent, or Firm* — Matthew D. Thayne; Thayne and Davis LLC

(57) ABSTRACT

Airbag cushions and related assemblies configured to protect the lower extremities of a driver by deploying about the contours of a steering column shroud. In some embodiments, the assembly may comprise an inflatable cushion configured to be deployed adjacent to a vehicle steering column to provide protection to a driver's lower extremities during an impact event. The cushion may comprise a primary inflation chamber, a first supplemental inflation chamber fluidly coupled with the primary inflation chamber and configured to deploy on a left side of the vehicle steering column adjacent to the driver's left lower extremity, and a second supplemental inflation chamber fluidly coupled with the primary inflation chamber and configured to deploy on a right side of the vehicle steering column adjacent to the driver's right lower extremity.

18 Claims, 9 Drawing Sheets

(51) Int. Cl.
  *B60R 21/00* (2006.01)
  *B60R 21/231* (2011.01)
(52) U.S. Cl.
  CPC ............... *B60R 2021/23308* (2013.01); *B60R 2021/23324* (2013.01); *B60R 2021/23382* (2013.01)

(56) References Cited

U.S. PATENT DOCUMENTS

| | | | | |
|---|---|---|---|---|
| 7,182,365 B2* | 2/2007 | Takimoto | ............... | B60R 21/206 |
| | | | | 280/730.1 |
| 7,232,149 B2* | 6/2007 | Hotta | ................... | B60R 21/206 |
| | | | | 280/730.1 |
| 7,549,671 B2 | 6/2009 | Mizuno et al. | | |
| 7,571,929 B2 | 8/2009 | Fukawatase et al. | | |
| 7,578,517 B2* | 8/2009 | Fukawatase | .......... | B60R 21/203 |
| | | | | 280/730.1 |
| 7,604,252 B2 | 10/2009 | Heitplatz et al. | | |
| 7,661,700 B2* | 2/2010 | Imamura | ............... | B60R 21/203 |
| | | | | 280/730.1 |
| 7,891,700 B2* | 2/2011 | Ishida | ................... | B60R 21/231 |
| | | | | 280/730.1 |
| 7,954,845 B2* | 6/2011 | Moritani | ............... | B60R 21/206 |
| | | | | 280/730.1 |
| 8,272,667 B2* | 9/2012 | Schneider | ............... | B60R 21/206 |
| | | | | 280/730.1 |
| 8,376,396 B2* | 2/2013 | Miller | ................... | B60R 21/206 |
| | | | | 280/729 |
| 8,505,969 B2* | 8/2013 | Mendez | ............... | B60R 21/2334 |
| | | | | 280/743.1 |
| 8,696,020 B2* | 4/2014 | Tanaka | .................. | B60R 21/233 |
| | | | | 280/730.1 |
| 8,764,053 B1* | 7/2014 | Dix | ........................ | B60R 21/232 |
| | | | | 280/730.1 |
| 9,180,835 B2* | 11/2015 | Fukawatase | .......... | B60R 21/206 |
| 9,272,681 B1* | 3/2016 | Enders | ..................... | B60R 21/21 |
| 9,376,084 B2* | 6/2016 | Choi | ..................... | B60R 21/233 |
| 9,446,735 B1* | 9/2016 | Jayasuriya | ............ | B60R 21/232 |
| 9,499,118 B2* | 11/2016 | Jindal | ................... | B60R 21/206 |
| 9,550,465 B1* | 1/2017 | El-Jawahri | .............. | B60R 21/26 |
| 9,580,040 B2* | 2/2017 | Komatsu | ............... | B60R 21/233 |
| 9,650,011 B1* | 5/2017 | Belwafa | ................ | B60R 21/233 |
| 9,663,058 B1* | 5/2017 | Whitens | ................ | B60R 21/045 |
| 9,676,355 B2* | 6/2017 | Kruse | ................. | B60R 21/0132 |
| 9,731,674 B1* | 8/2017 | Jindal | ................... | B60R 21/231 |
| 9,738,243 B2* | 8/2017 | Fukawatase | ........ | B60R 21/2338 |
| 9,827,939 B1 | 11/2017 | Roychoudhury et al. | | |
| 9,845,067 B2* | 12/2017 | Morris | ................... | B60R 21/239 |
| 9,902,359 B2* | 2/2018 | Takeshita | ............... | B60R 21/231 |
| 9,956,937 B2* | 5/2018 | Jindal | ................... | B60R 21/205 |
| 10,155,496 B2* | 12/2018 | Faruque | ................ | B60R 21/233 |
| 10,351,091 B2* | 7/2019 | Abe | ........................ | B60R 21/2334 |
| 10,391,968 B2* | 8/2019 | Jaradi | ................... | B60R 21/231 |
| 10,427,638 B2* | 10/2019 | Choi | ..................... | B60R 21/233 |
| 10,562,482 B2* | 2/2020 | Zhao | ................... | B60R 21/206 |
| 2003/0116945 A1* | 6/2003 | Abe | ........................ | B60R 21/231 |
| | | | | 280/729 |
| 2018/0345899 A1 | 12/2018 | Munsee et al. | | |
| 2018/0361978 A1* | 12/2018 | Belwafa | ................ | B60R 21/233 |

* cited by examiner

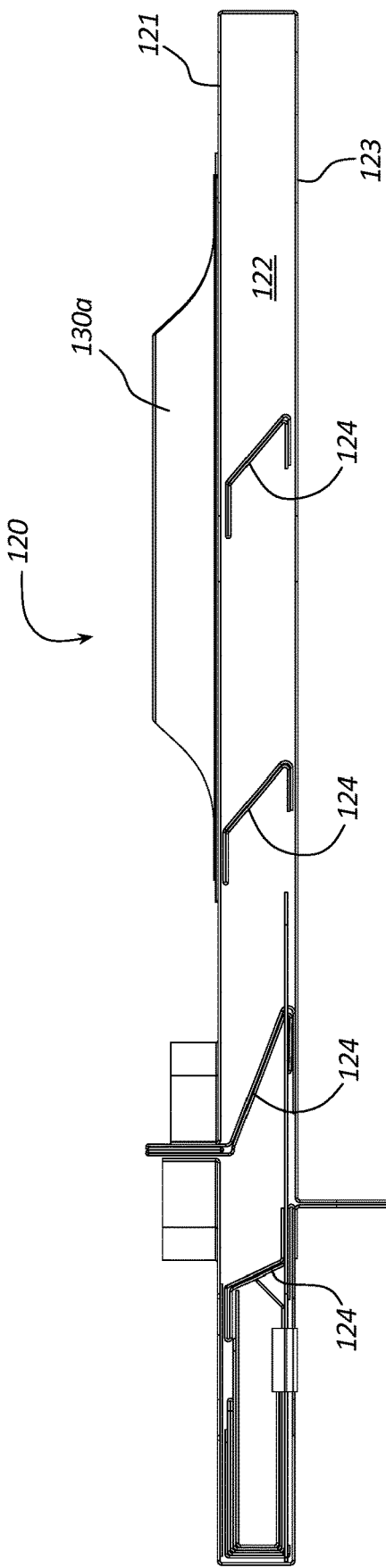
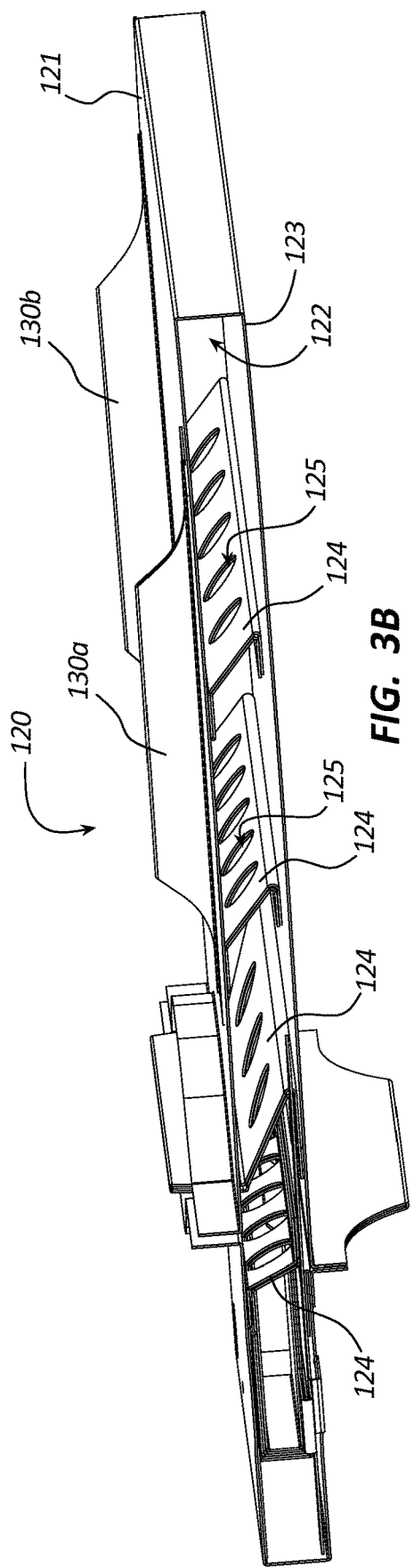
FIG. 3A
FIG. 3B

MULTI-CHAMBERED DRIVER-SIDE AIRBAG ASSEMBLIES

SUMMARY

Airbag cushions are often configured to provide protection to a vehicle occupant's knees. However, the contours of this region of a vehicle often introduce difficulties that can render deployment kinematics less than ideal. For example, the steering column and/or steering column shroud on the driver's side of vehicles create large gaps on either side of the steering column in between the driver's knees, the steering column/shroud, and the adjacent panel. These gaps may cause many airbag cushions to pivot a driver's legs, deflect, or otherwise perform in an undesirable manner.

The present inventors have therefore determined that it would be desirable to provide apparatus, systems and methods that overcome one or more of the foregoing limitations and/or other limitations of the prior art. In some embodiments, the inventive concepts disclosed herein may therefore allow for a driver's side cushion to be deployed to provide improved protection to the driver's knees and/or lower extremities by occupying these gaps. In preferred embodiments, these gaps may be occupied by one or more supplemental inflation chambers, which may be applied to an airbag cushion by way of a patch that may be fluidly coupled with a primary inflation chamber by way of one or more slits or other openings.

In a more particular example of an airbag cushion assembly according to some embodiments, the airbag cushion assembly may comprise an inflatable cushion configured to be deployed adjacent to a vehicle steering column to provide protection to a driver's lower extremities during an impact event. The inflatable cushion may comprise a primary inflation chamber, a first supplemental inflation chamber fluidly coupled with the primary inflation chamber and configured to deploy on a left side of the vehicle steering column adjacent to the driver's left lower extremity, and a second supplemental inflation chamber fluidly coupled with the primary inflation chamber and configured to deploy on a right side of the vehicle steering column adjacent to the driver's right lower extremity. In some embodiments, the first and/or second supplemental inflation chambers may be defined by patches applied to a panel of the cushion.

Some embodiments may further comprise one or more tethers, such as preferably internal tethers, which may extend between the first supplemental inflation chamber and the second supplemental inflation chamber. In some such embodiments, the tethers may comprise one or more openings and may therefore serve as functional baffles.

In some embodiments, the first and second supplemental inflation chambers may comprise elongated chambers extending along longitudinal axes at least substantially parallel to each other. In some such embodiments, the internal tether may extend in a direction at least substantially perpendicular to one or both of these longitudinal axes.

In some embodiments, one or both of the first supplemental inflation chamber and the second supplemental inflation chamber may be fluidly coupled with the primary inflation chamber by way of one or more inflation slits configured to allow for inflation gas to enter from the primary inflation chamber.

The first and second supplemental inflation chambers may extend along respective longitudinal axes and may each comprise a length extending along its respective longitudinal axis. In some such embodiments, each of the inflation slits may extend at least substantially the entire length of its respective supplemental inflation chamber.

In some embodiments, one or more of the internal tethers may extend between the first supplemental inflation chamber and/or the second supplemental inflation chamber without extending into or beyond the inflation slits and/or without extending into or beyond the structure defining the external walls of the first and/or second supplemental inflation chambers.

Some embodiments may comprise a plurality of internal tethers, wherein each of the plurality of internal tethers extends between the first supplemental inflation chamber and the second supplemental inflation chamber without extending into or beyond the inflation slits and/or without extending into or beyond the structure defining the external walls of the first and/or second supplemental inflation chambers.

In some embodiments, the first supplemental inflation chamber may not be directly fluidly coupled with the second supplemental inflation chamber.

In an example of an airbag cushion module according to some embodiments, the module may comprise an inflator and an inflatable cushion, which may comprise a primary inflation chamber coupled with the inflator such that the inflator is configured to directly inflate the primary inflation chamber, a first supplemental inflation chamber fluidly coupled with the primary inflation chamber so as to be inflated indirectly from the inflator, and a second supplemental inflation chamber fluidly coupled with the primary inflation chamber so as to be inflated indirectly from the inflator. Some embodiments may further comprise one or more internal tethers, which may extend between the first supplemental inflation chamber and the second supplemental inflation chamber.

Some embodiments may further comprise a first inflation opening, such as one or more slits or holes, configured to deliver inflation gas from the primary inflation chamber to the first supplemental inflation chamber and a second inflation opening configured to deliver inflation gas from the primary inflation chamber to the second supplemental inflation chamber.

In some embodiments, the internal tether(s) may extend at least substantially an entire distance between the first inflation opening and the second inflation opening without extending into or beyond the first inflation opening or the second inflation opening and/or without extending into and/or beyond the structure defining the external walls of the first and/or second supplemental inflation chambers.

In some embodiment, the first inflation opening may comprise a first slit, which may extend along an axis of the first supplemental inflation chamber, and the second inflation opening may comprise a second slit, which may extend along an axis of the second supplemental inflation chamber. In some embodiment, the first inflation opening may comprise a plurality of slits, such as spaced slits extending along an axis of the first supplemental inflation chamber, and the second inflation opening may similarly comprise a plurality of slits extending along an axis of the second supplemental inflation chamber.

In some embodiments, the internal tether(s) may extend in a direction at least substantially perpendicular to one or both of the longitudinal axes of the first and second supplemental inflation chambers.

In some embodiments, the elongated axes of the first and second supplemental inflation chambers may extend in directions at least substantially parallel to each other.

In another example of an airbag cushion assembly according to still other embodiments, the assembly may comprise an inflatable cushion configured to be deployed adjacent to a vehicle steering column to provide protection to a driver's knees and/or other lower extremities during an impact event. The inflatable cushion may comprise a front panel and a rear panel coupled with the front panel. A plurality of tethers may extend between the front panel and the rear panel so as to, in some embodiments, define a thickness of a primary inflation chamber and/or shroud portion of the cushion. The shroud portion may be configured to deploy adjacent to a vehicle steering column shroud during deployment. The cushion may further comprise a left knee portion configured to deploy adjacent to a driver's left knee during deployment. The left knee portion may comprise a thickness greater than a thickness of the shroud portion, which in some embodiments may be due to the presence of one or more supplemental inflation chambers, which may define the thickness of the left knee portion along with a primary inflation chamber. The cushion may further comprise a right knee portion configured to deploy adjacent to a driver's right knee during deployment. The right knee portion may also comprise a thickness greater than a thickness of the shroud portion, which in some embodiments may also be due to the presence of one or more supplemental inflation chambers defining the thickness of the right knee portion along with a primary inflation chamber, such that the left knee portion and the right knee portion extend into regions to the left and right, respectively, of the vehicle steering column shroud.

In some embodiments, the left knee portion comprises a first supplemental inflation chamber fluidly coupled with a primary inflation chamber; and the right knee portion may comprise a second supplemental inflation chamber fluidly coupled with the primary inflation chamber.

In some embodiments, the first supplemental inflation chamber and/or the second supplemental inflation chamber may be positioned external of the primary inflation chamber and may be fluidly coupled with the primary inflation chamber via respective inflation openings.

In some embodiments, the shroud portion may be wholly defined by the primary inflation chamber, the left knee portion may be partially defined by the shroud portion and partially defined by the first supplemental inflation chamber, and the right knee portion may be partially defined by the shroud portion and partially defined by the second supplemental inflation chamber.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which:

FIG. 3A is a cross-sectional view of the airbag cushion;

FIG. 3B is a perspective, cross-sectional view of the airbag cushion;

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
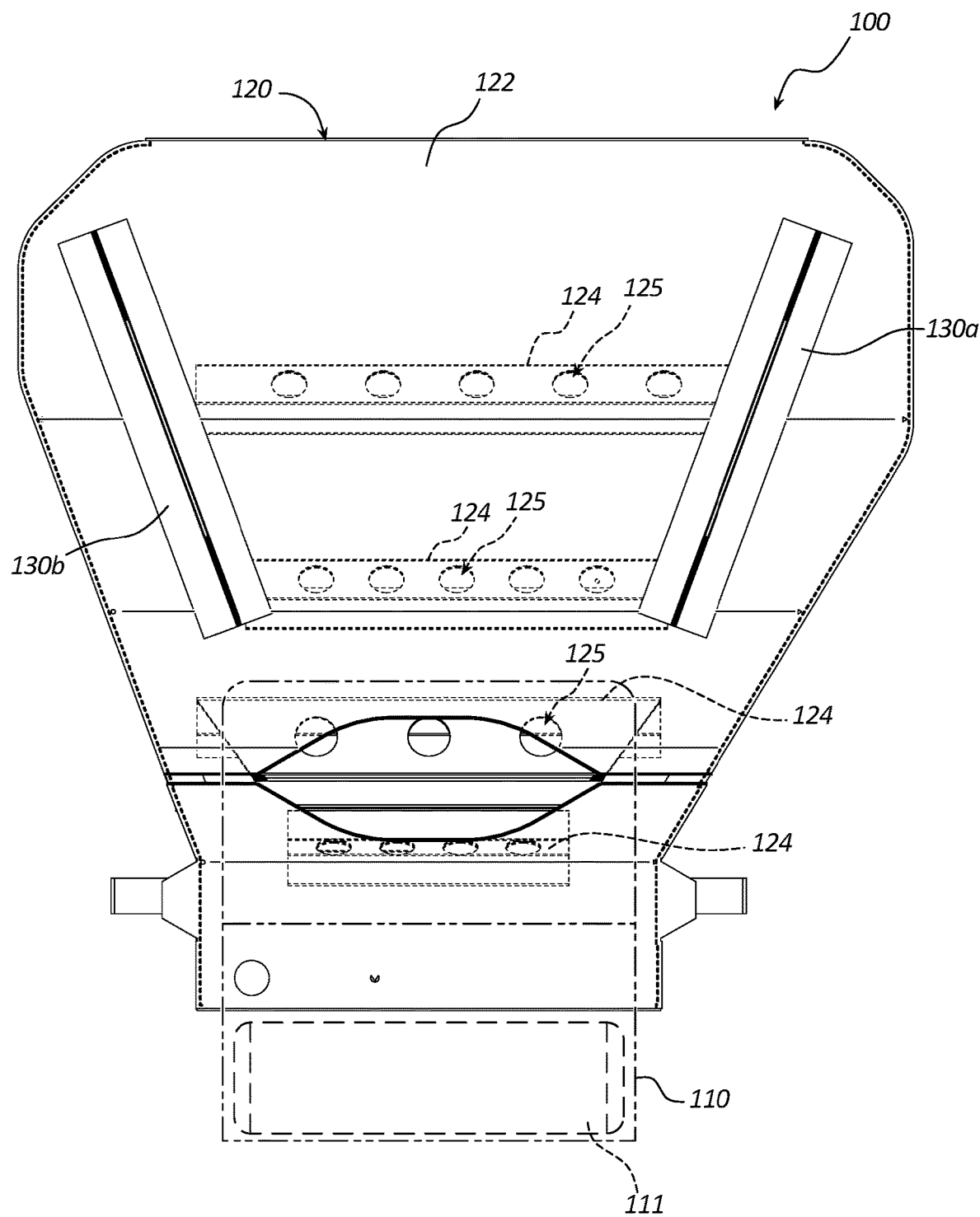
FIG. 1 depicts an embodiment of an airbag assembly according to some embodiments with internal components of the airbag cushion shown in phantom.

FIG. 1 depicts an airbag cushion assembly 100 according to some embodiments. Airbag cushion assembly 100 comprises a housing 110 further comprising an inflator 111 configured to inflate an airbag cushion 120 comprising a plurality of chambers fluidly coupled with one another. In preferred embodiments, and as discussed in greater detail below, airbag cushion assembly 100 is configured comprises a cushion 120 configured to be deployed adjacent to a vehicle steering column to provide protection to an occupant's (most typically a driver's) knees and/or other lower extremities during an impact event. As illustrated in FIG. 1, inflatable cushion 120 comprises a primary inflation chamber 122, a structure (in the depicted embodiment, a patch 130a) defining a first supplemental inflation chamber 132a (see FIG. 4B) fluidly coupled with the primary inflation chamber 122, and another structure (in the depicted embodiment, a second patch 130b) defining a second supplemental inflation chamber 132b also fluidly coupled with primary inflation chamber 122. Because FIG. 1 depicts airbag cushion 120 in an uninflated state, the dimensions of the inflation chambers 132a/132b—which in preferred embodiments are configured to deploy on left and right sides, respectively, of a vehicle steering column adjacent to a driver or other occupant's knees—following inflation are not yet apparent. However, as discussed further below, these chambers are preferably configured to deploy so as to fill the space on opposite sides of a vehicle steering column to provide stability and/or enhance the protective impact to the driver's or other occupant's knees and/or other lower extremities. Although the most preferred embodiments are specifically designed with a vehicle steering column in mind, it should be understood that alternative embodiments are contemplated in which similar supplemental inflation chambers may be configured to enhance desired inflation/deployment characteristics about another component of a vehicle.

Figure 2B:
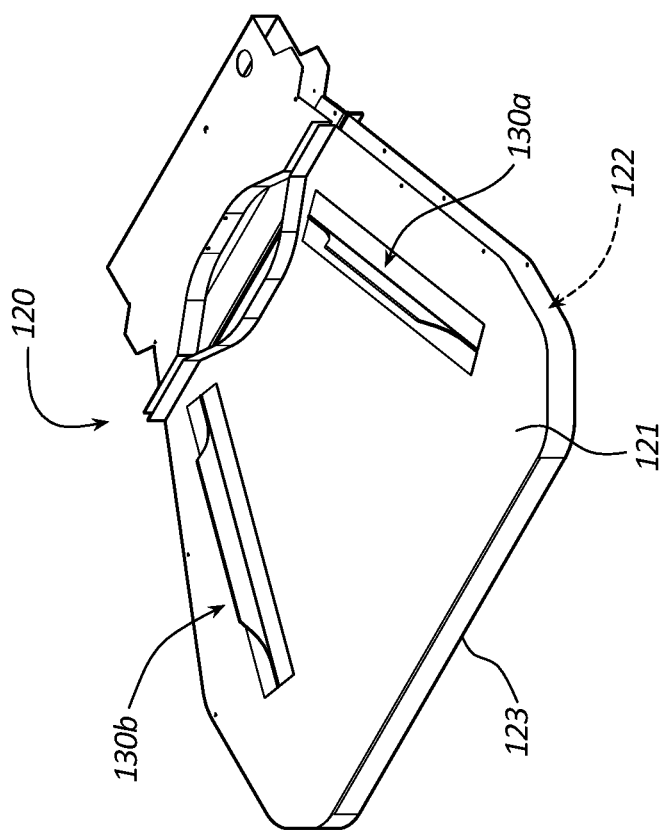
FIG. 2B is a perspective view of the airbag cushion of FIG. 2A showing the patches coupled to an external surface of the cushion.
Figure 2A:
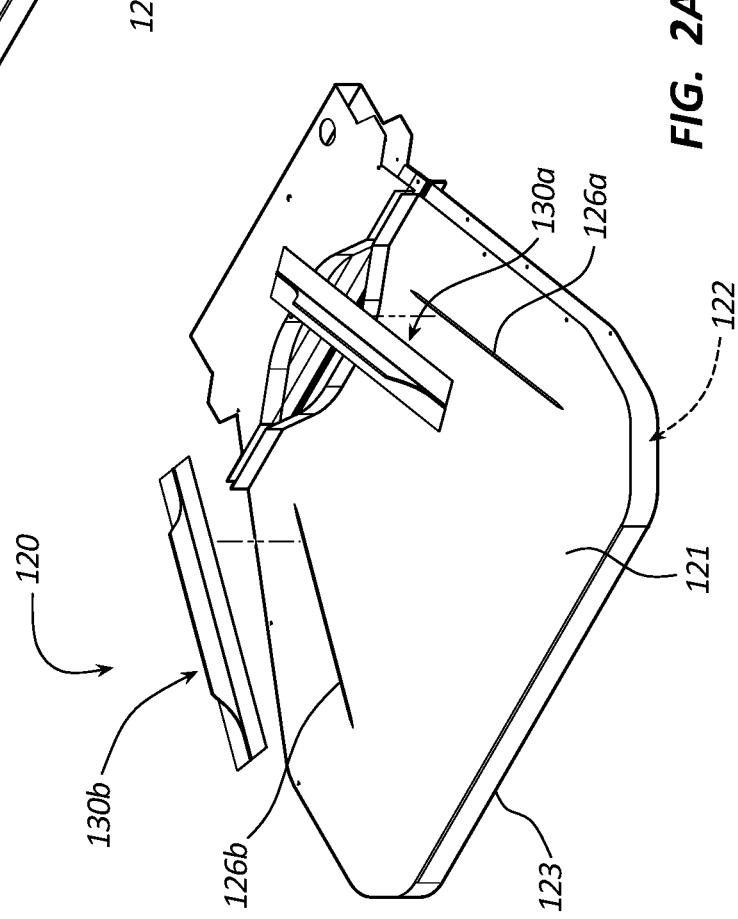
FIG. 2A is an exploded perspective view of the airbag cushion of the airbag assembly of FIG. 1 showing external patches used to form supplemental inflation chambers that may be used to protect a driver's knees and/or lower extremities.
Figure 3C:
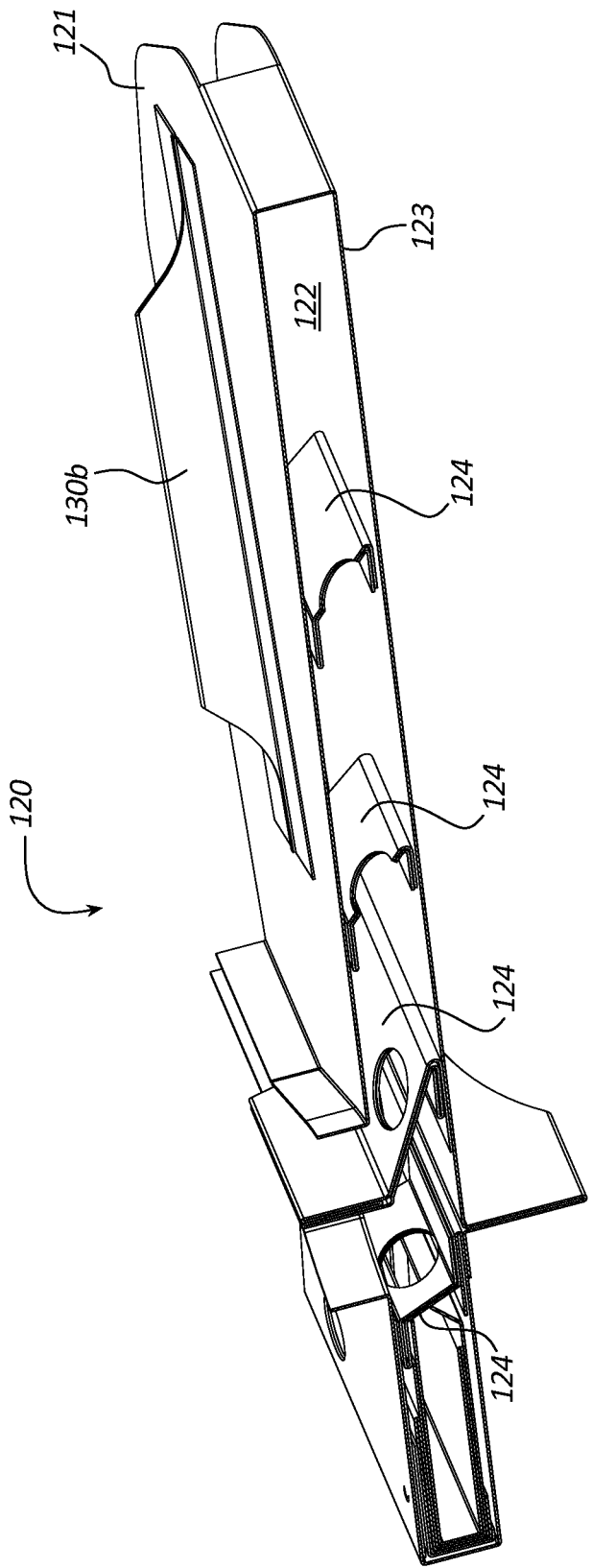
FIG. 3C is another perspective, cross-sectional view of the airbag cushion with the cross section taken in between the two supplemental inflation chambers.

Airbag cushion assembly 100 further comprises a plurality of internal tethers 124. Tethers 124 may comprise openings 125 and may therefore further serve functionally as baffles in some embodiments. Tethers 124 may also be configured to define a preferred structure for the cushion 120. Thus, as illustrated in FIGS. 2-3, tethers 124 may be coupled within the primary inflation chamber 122 in between a first panel 121 and a second panel 123 of cushion 120. Tethers 124 may thereby define a thickness of at least one or more portions of primary inflation chamber 122 of cushion 120. In preferred embodiments, one or more of tethers 124 extend between the structures (patches 130a and 130b, for example) defining first supplemental inflation chamber 132a and second supplemental inflation chamber 132b and/or the supplemental inflation chambers 132a/132b themselves. This may be preferred for a variety of reasons, such as allowing for inflation of supplemental inflation chambers 132a/132b without impedance caused by the means (sew lines, for example) with which tethers 124 are coupled with cushion 120.

In the depicted embodiment, each of supplemental inflation chambers 132a/132b may be coupled with primary inflation chamber 122 by way of slits 126a and 126b, respectively, that may be formed in panel 121 of cushion 120. These slits 126a/126b extend along respective longitudinal axes of their respective patch 130a/130b. In some embodiments, including the embodiment depicted in FIGS. 1-4, slits 126a/126b extend at least substantially the entire length of its respective supplemental inflation chamber 132a/132b. In alternative embodiments, however, other means for fluidly coupling supplemental inflation chambers may be used, such as a series of spaced slits or other openings. In some embodiments, such openings may define a hole, which may have dimensions similar in shape and/or size to the inflation chamber through which such hole will ultimately deliver inflation gas.

Providing one or more slits and/or holes may allow for precision control over the inflation of the supplemental inflation chambers. For example, by controlling the length, positioning, and/or other dimensions of the slits/openings, various embodiments of the invention may be finely tuned according to the contours, such as the steering column shroud and/or instrument panel, of each particular vehicle in accordance with desired inflation characteristics.

Some embodiments may further allow for tuning by altering the depth (measured in a direction away from the primary inflation chamber in knee airbag embodiments) of the various supplemental inflation chambers. For example, by increasing the depth sufficiently, the primary inflation chamber may be lifted away from the steering column shroud and/or instrument panel by a desired amount, which may be beneficial in more severe impact events without requiring increased inflation gas pressure as may otherwise be needed. In some embodiments, this may allow for providing this benefit without requiring that the depth/thickness of the primary inflation chamber be altered. By appropriately controlling slit/opening sizes to delay inflation of the supplemental inflation chambers vis-à-vis the primary inflation chamber, this benefit may be achieved without impacting positioning time.

Figures 4A, 4B:
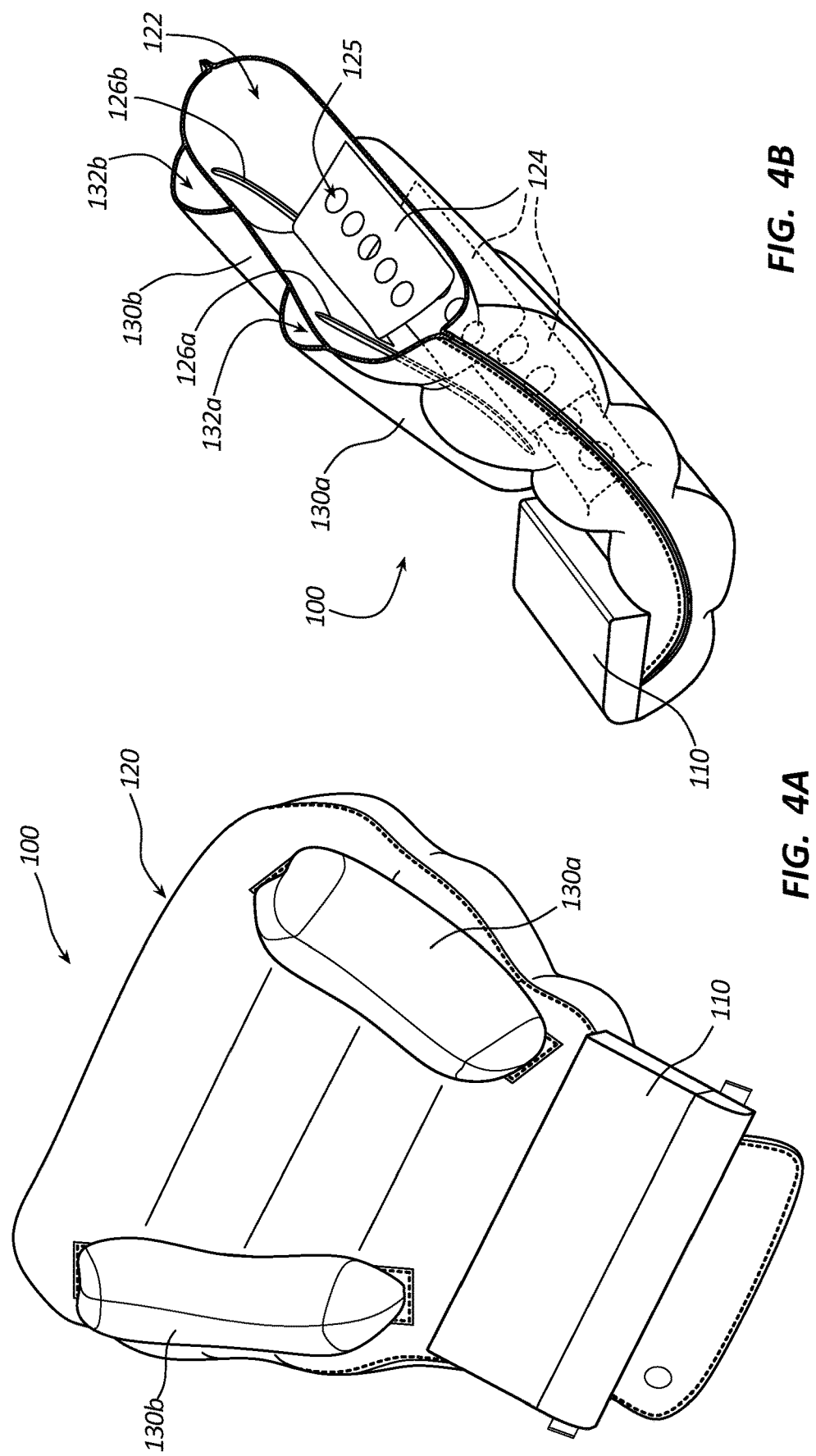
FIG. 4A is a perspective view of the airbag assembly following inflation.
FIG. 4B is a cross-sectional, perspective view of the airbag assembly of FIG. 4A following inflation and showing various internal components in phantom.

As best shown in FIG. 4B, in preferred embodiments, one or more (in some embodiments, all) of the internal tethers 124 extend between first supplemental inflation chamber 132a and second supplemental inflation chamber 132b without extending into or beyond the inflation slits 126a and 126b, respectively. This may facilitate an easier manufacturing process and/or improve desired inflation characteristics as it may allow for sewing or otherwise coupling tethers 124 to one or more of the panels defining primary inflation chamber 122 without sewing or otherwise coupling through the structures defining the supplemental inflation chambers 132a/132b and/or without closing a portion of slits 126a/126b. Thus, in some such embodiments, one or more (in some embodiments, all) of the internal tethers 124 may extend between the inner peripheries of patches 130a/130b or another suitable structure defining first supplemental inflation chamber 132a and second supplemental inflation chamber 132b without extending into or beyond those structures so that tethers 124 do not interfere with the inflation of and/or ultimate inflated characteristics of the supplemental inflation chambers 132a/132b.

However, after having received the benefit of this disclosure, a variety of alternative embodiments may be apparent to those of ordinary skill in the art. For example, rather than limiting the length of the tethers 124 to the length between slits 126a/126b, supplemental inflation chambers 132a/132b, and/or the peripheries of the structures defining supplemental inflation chambers 132a/132b, in some embodiments, slits or other openings may be spaced apart and may therefore allow for extending a tether beyond these limits. In some embodiments, a series of spaced supplemental chambers may be formed on both sides of cushion 120 so as to collectively define a single structure for filling in the gap on one side of a steering column shroud or other structure. With respect to such embodiments, in some cases tethers may extend within the primary inflation chamber past the spaced supplemental chambers along portions of the cushion corresponding with spaces between these spaced supplemental chambers.

In the depicted embodiment, supplemental inflation chambers 132a/132b comprise elongated chambers extending along longitudinal axes that may be parallel, or at least substantially parallel, to each other. Similarly, as shown in several of the accompanying figures including FIG. 4B, one or more (in some cases, all) of the internal tethers 124 extend in at least substantially perpendicular to the longitudinal axes of supplemental inflation chambers 132a/132b.

As also best illustrated in FIG. 4B, in some embodiments, some of the internal tethers 124 may be positioned within primary inflation chamber 122 at a position beyond the periphery of slits 126a/126b and/or the full periphery of the respective supplemental inflation chambers 132a/132b.

As alluded to above, FIGS. 4A and 4B depict airbag cushion 120 in an inflated state, including primary inflation chamber 122 and supplemental inflation chambers 132a and 132b. As best illustrated in FIG. 4B, tethers 124 may help define the structure of the inflated airbag cushion by forming a series of tube-like structures between the opposing sides of the cushion perpendicular to, or at least substantially perpendicular to, the supplemental inflation chambers 132a and 132b. Preferably gas flow between these various sub-portions of primary inflation chamber 122 is relatively unimpeded, which may be enhanced by providing openings 125 in one or more of tethers 124, as previously mentioned.

In some embodiments, other features may be included to further alter/control inflation characteristics. For example, some embodiments may comprise one-way valves to control pressure inside one of more of the various inflation chambers. With respect to the disclosed supplemental inflation chambers, for example, some embodiments may comprise one or more fabric layers positioned within one or more of the supplemental chambers that may be configured to seal the slit(s) or other opening(s) that deliver inflation gas into the supplemental chamber(s) once a threshold pressure within the supplemental chamber(s) has been reached. An example of such a valve is disclosed in U.S. Pat. No. 9,827,939 titled AIRBAG WITH INDIVIDUALLY TUNABLE COMPARTMENTS, which is hereby incorporated by specific reference herein in its entirety.

Figure 5B:
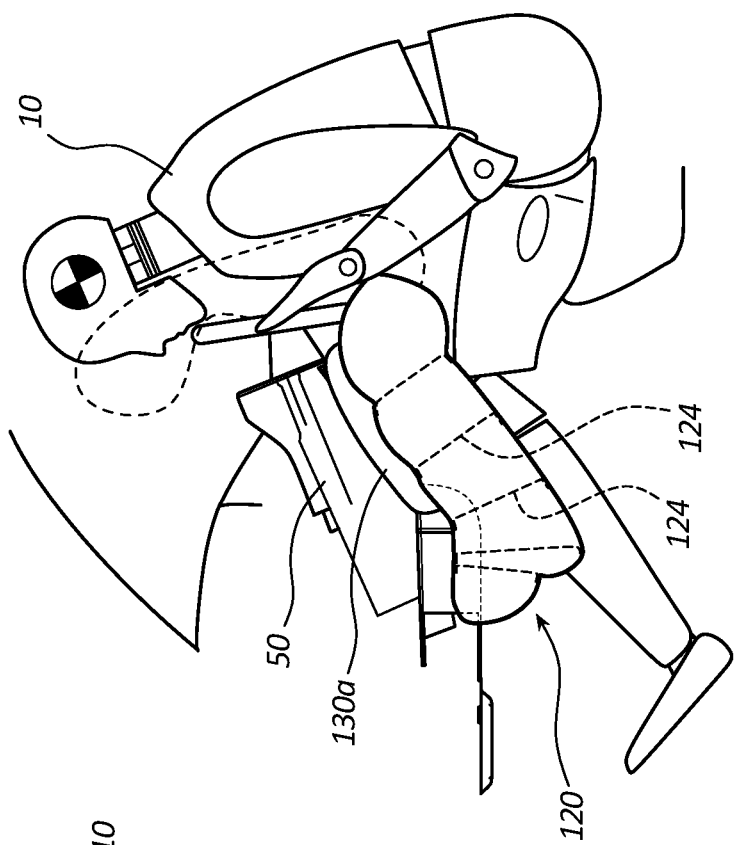
FIG. 5B depicts the interior of the vehicle shown in FIG. 5A following deployment of the airbag cushion.
Figure 5A:
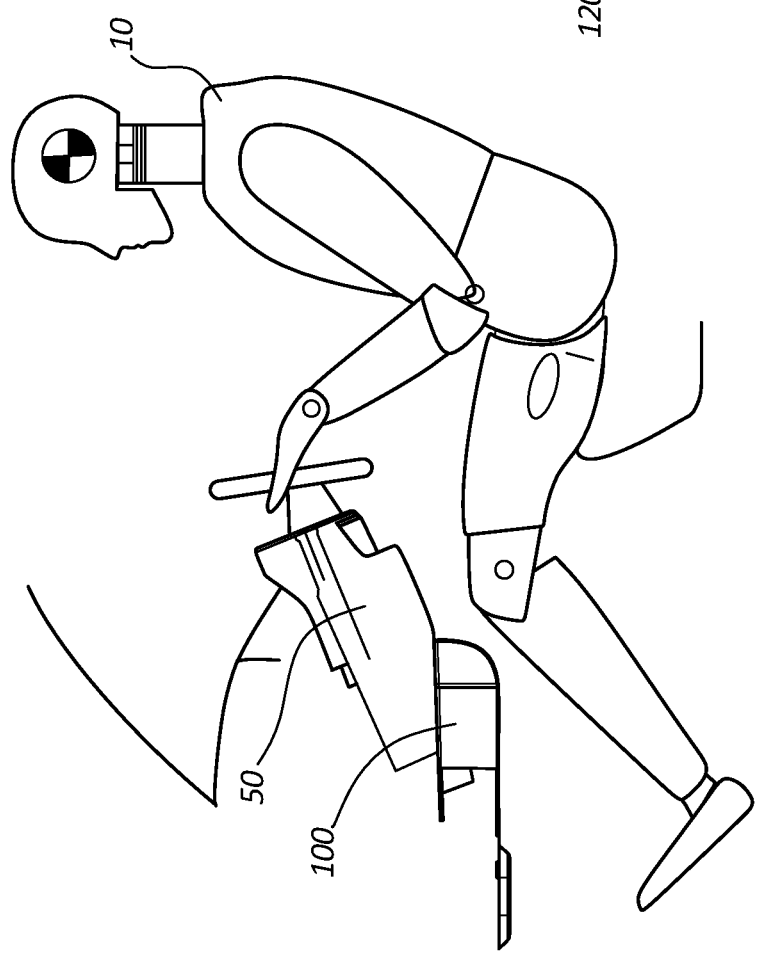
FIG. 5A depicts the interior of a vehicle including an airbag module comprising an exemplary embodiment of the airbag cushion.

FIGS. 5A and 5B illustrate an example of a preferred deployment of airbag cushion 120 from a module 100, which may be positioned below a steering column shroud 50 to protect the lower knees/extremities of a driver 10 or another vehicle occupant. FIG. 5A illustrates a configuration prior to deployment and FIG. 5B illustrates a configuration following a deployment resulting from an impact event.

As illustrated in FIG. 5B, airbag cushion 120 may inflate so as to extend along and protect the lower legs of driver 10. One of the two opposing patches defining opposing supplemental inflation chambers 132a/132b, namely patch 130a, is illustrated as extending along the left side of steering column shroud 50 so as to occupy the gap between the steering column shroud and the panel below the dashboard. Although patch 130a and its corresponding inflation chamber are illustrated as relatively small, cushion 120 may be manufactured to provide any shape/size of supplemental inflation chambers as needed in accordance with the dimensions of this area of the vehicle as desired.

Figure 5C:
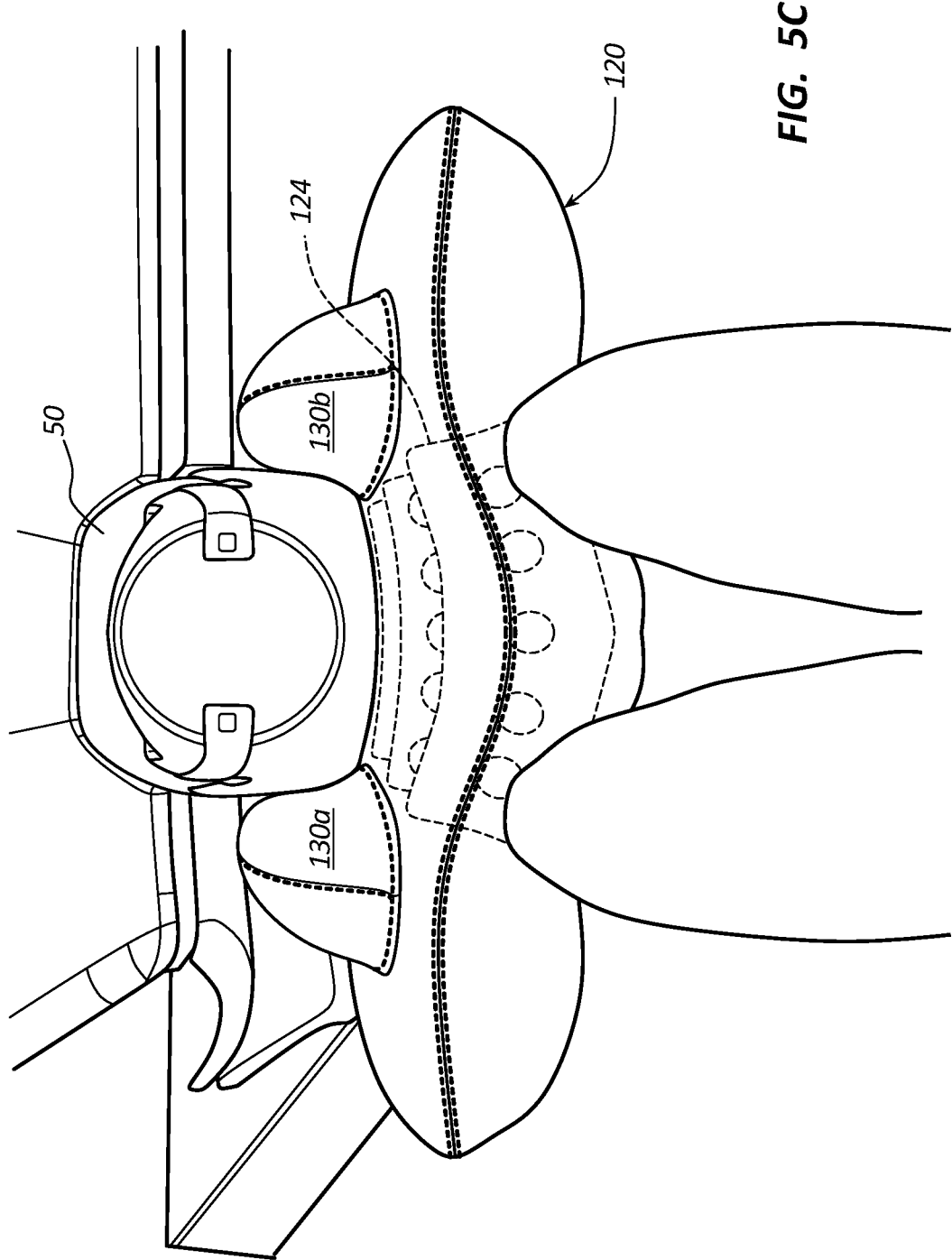
FIG. 5C is a top plan view of the vehicle interior following deployment.

FIG. 5C illustrates a top view of airbag cushion 120 following deployment and better illustrates both patches 130a and 130b forming supplemental inflation chambers that, respectively, extend into the spaces on the left and right sides of steering column shroud 50 to enhance the stability of airbag cushion 120 and/or improve its ability to provide protection to the knees and/or other lower extremities of the adjacent vehicle occupant. As previously mentioned, the size, shape, and dimensions of the supplemental inflation chambers may vary as desired in accordance with the dimensions of the vehicle space within which the supplemental inflation chambers will extend. It is also contemplated that alternative embodiments may be configured to inflate toward the driver/occupant's knees and/or lower extremities rather than towards the vehicle panel adjacent the steering column if desired.

Figure 6:
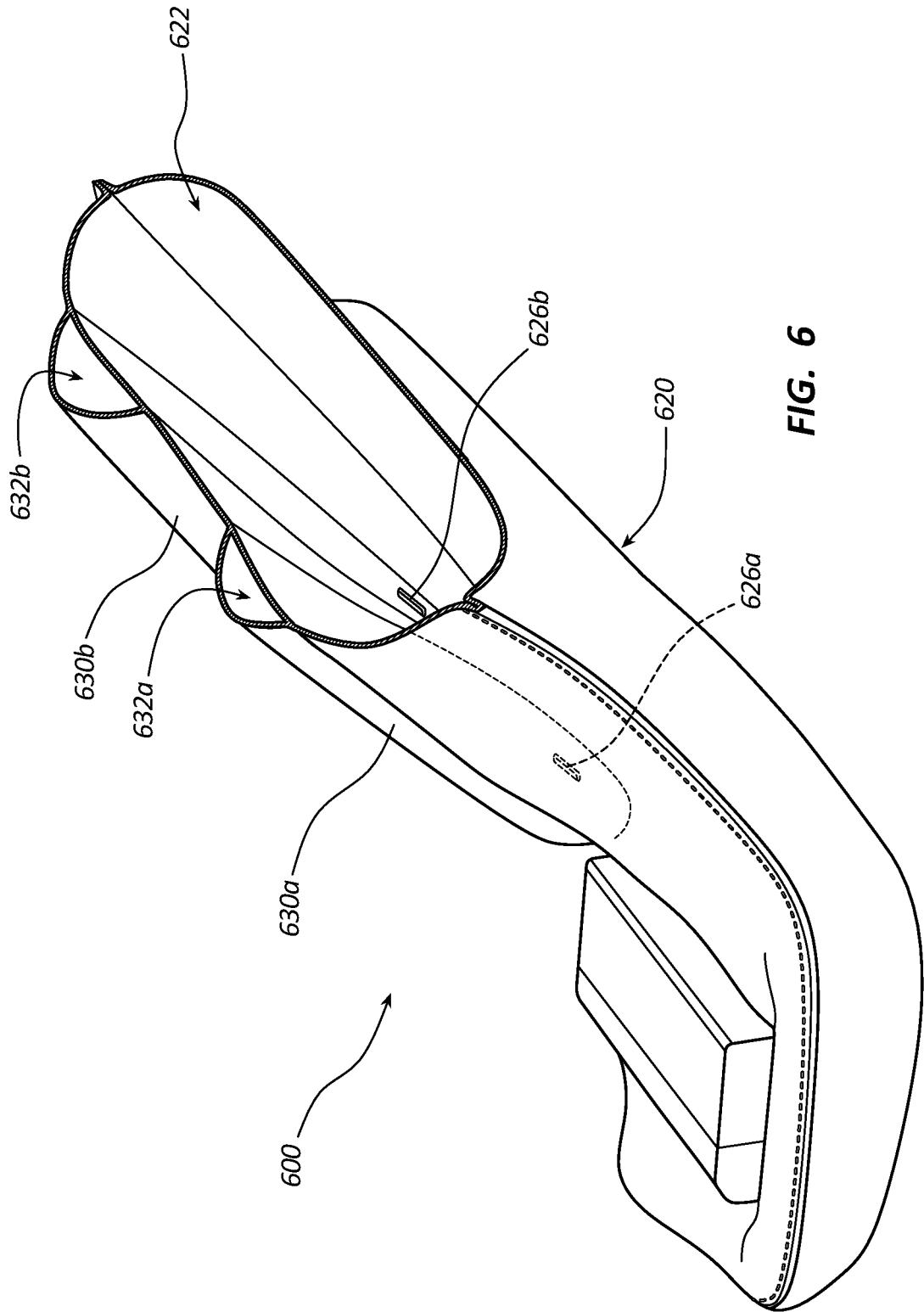
FIG. 6 is a cross-sectional, perspective view of an airbag assembly according to other embodiments following inflation and showing various internal components in phantom.

FIG. 6 illustrates an alternative embodiment of an airbag cushion assembly 600. Airbag cushion assembly 600 differs from assembly 100 in that, as shown in the drawing, slits 626a/626b only extend a short distance along their respective supplemental inflation chambers 632a/632b, respectively. As with assembly 100, supplemental inflation chambers 632a/632b may, if desired, be formed from respective patches 630a/630b that may be coupled to primary inflation chamber 622 of airbag cushion 620.

Figure 7:
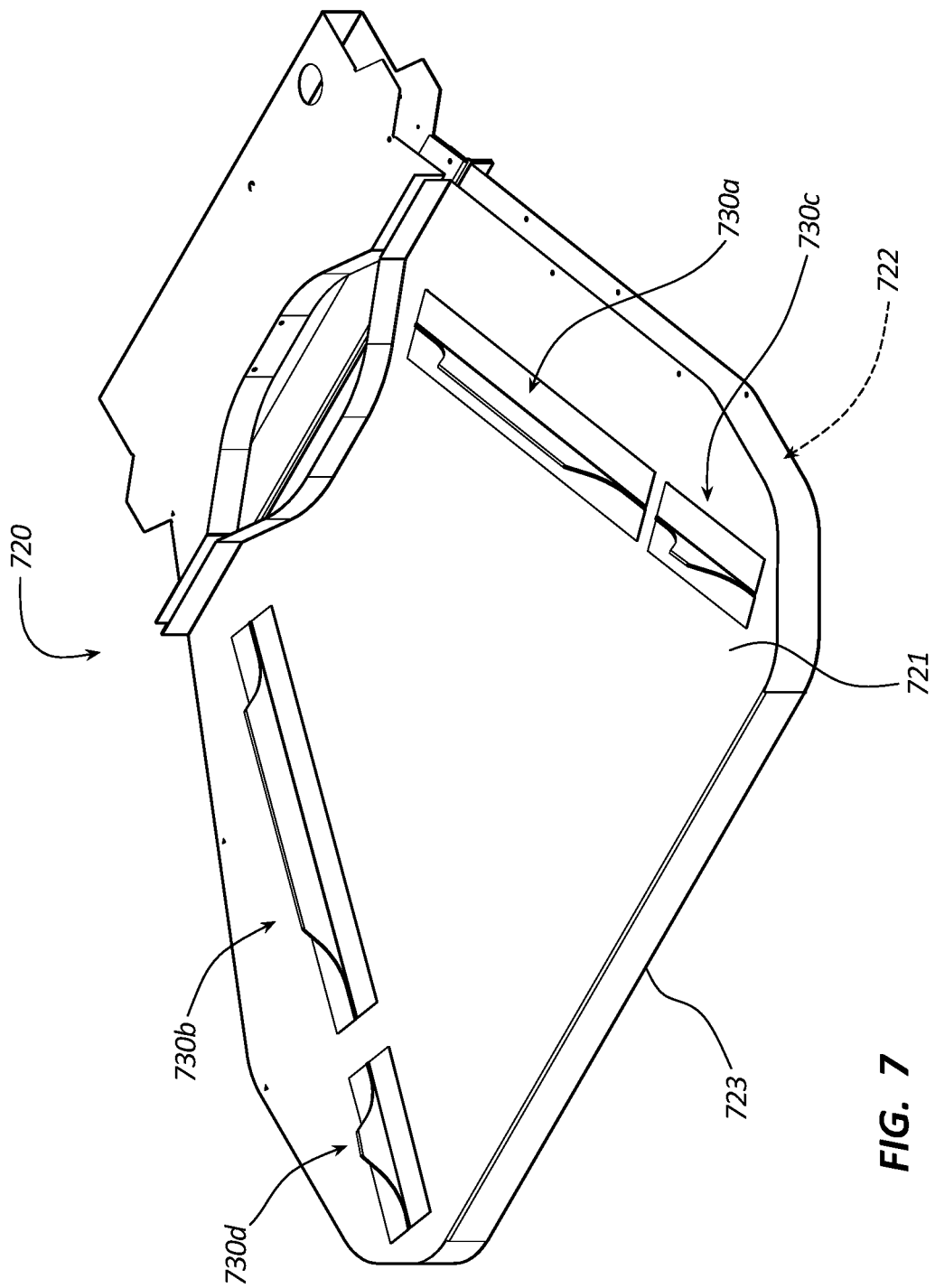
FIG. 7 is a perspective view of an airbag cushion for use in connection with airbag assemblies according to still other embodiments.

FIG. 7 is a perspective view of another airbag cushion 720 that may be used in other airbag cushion assemblies according to still other embodiments. As illustrated in this figure, cushion 720 again comprises a primary inflation chamber 722 defined by opposing panels 721 and 723 and a plurality of structures, such as patches, defining a plurality of supplemental inflation chambers. Unlike the previous embodiments, cushion 720 comprises two adjacent patches on both opposing ends of one side of the cushion 720 that define separate supplemental inflation chambers that may be functionally coupled so as to together define a structure for providing suitable spacing and/or separation with vehicle structures such as a vehicle steering column shroud.

More particularly, in the embodiment of FIG. 7, one side of cushion 720 comprises a first pair of adjacent supplemental inflation chambers defined by a pair of adjacent patches 730a/730c fluidly coupled with the primary inflation chamber 722, and another pair of adjacent supplemental inflation chambers defined by a pair of adjacent patches 730b/730d also fluidly coupled with primary inflation chamber 722.

By providing a series of spaced supplemental chambers on both sides, unique shapes and/or features of particular vehicles may be better accommodated. Although not visible in FIG. 7, it also be understood that this spacing may also allow for internal tethers within primary inflation chamber 722 to extend past one or more of the supplemental inflation chambers on both sides of the cushion through the spaces in between the adjacent supplemental inflation chambers. The adjacent supplemental inflation chambers may extend at least substantially along a single line on both ends of the cushion, as depicted in FIG. 7 or, alternatively, may be curved or angled to extend towards different directions, which, again, may allow for directing the supplemental inflation chambers along and/or spacing the primary inflation chamber away from various features within a vehicle, such as oversized steering column shrouds, instrument panel features, and the like.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. An airbag cushion assembly, comprising:
an inflatable cushion configured to be deployed adjacent to and engage a vehicle steering column to provide protection to a driver's lower extremities during an impact event, wherein the inflatable cushion comprises:
a primary inflation chamber;
a first supplemental inflation chamber coupled to an exterior surface of the inflatable cushion, fluidly coupled with the primary inflation chamber and configured to deploy on a left side of the vehicle steering column adjacent to the driver's left lower extremity; and
a second supplemental inflation chamber coupled to an exterior surface of the inflatable cushion, fluidly coupled with the primary inflation chamber and configured to deploy on a right side of the vehicle steering column adjacent to the driver's right lower extremity,
wherein each of the first supplemental inflation chamber and the second supplemental inflation chamber comprises an inflation slit formed in a panel defining the primary inflation chamber and configured to allow for inflation gas to enter from the primary inflation chamber.

2. The airbag cushion assembly of claim 1, further comprising an internal tether extending between the first supplemental inflation chamber and the second supplemental inflation chamber.

3. The airbag cushion assembly of claim 2, wherein the first and second supplemental inflation chambers comprise elongated chambers extending along longitudinal axes at least substantially parallel to each other, and wherein the internal tether extends in a direction at least substantially perpendicular to the longitudinal axes.

4. The airbag cushion assembly of claim 2, wherein the internal tether extends between the first supplemental inflation chamber and the second supplemental inflation chamber without extending into or beyond the inflation slits.

5. The airbag cushion assembly of claim 2, further comprising a plurality of internal tethers, wherein each of the plurality of internal tethers extends between the first supplemental inflation chamber and the second supplemental inflation chamber without extending into or beyond the inflation slits.

6. The airbag cushion assembly of claim 1, wherein each of the first and second supplemental inflation chambers extends along a longitudinal axis and comprises a length extending along its respective longitudinal axis, and wherein each of the inflation slits extends at least substantially the entire length of its respective supplemental inflation chamber.

7. The airbag cushion assembly of claim 1, wherein the first supplemental inflation chamber is not directly fluidly coupled with the second supplemental inflation chamber.

8. An airbag cushion module, comprising:
an inflator; and
an inflatable cushion, comprising:
a primary inflation chamber coupled with the inflator such that the inflator is configured to directly inflate the primary inflation chamber;
a first supplemental inflation chamber fluidly coupled with the primary inflation chamber so as to be inflated indirectly from the inflator; and
a second supplemental inflation chamber fluidly coupled with the primary inflation chamber so as to be inflated indirectly from the inflator;
an internal tether extending between the first supplemental inflation chamber and the second supplemental inflation chamber;
a first inflation opening formed in a panel defining the primary inflation chamber, and configured to deliver inflation gas from the primary inflation chamber to the first supplemental inflation chamber; and
a second inflation opening formed in the panel defining the primary inflation chamber, and configured to deliver inflation gas from the primary inflation chamber to the second supplemental inflation chamber,
wherein the internal tether is spaced apart from the first inflation opening and the second inflation opening without extending into either the first inflation opening or the second inflation opening.

9. The airbag cushion module of claim 8, wherein the internal tether extends at least substantially an entire distance between the first inflation opening and the second inflation opening without extending into or beyond the first inflation opening or the second inflation opening.

10. The airbag cushion module of claim 8, wherein the first inflation opening comprises a first slit extending along an axis of the first supplemental inflation chamber, and wherein the second inflation opening comprises a second slit extending along an axis of the second supplemental inflation chamber.

11. The airbag cushion module of claim 8, wherein the first inflation opening comprises a plurality of slits extending along an axis of the first supplemental inflation chamber, and wherein the second inflation opening comprises a plurality of slits extending along an axis of the second supplemental inflation chamber.

12. The airbag cushion module of claim 8, wherein the first and second supplemental inflation chambers comprise elongated chambers extending along longitudinal axes, and wherein the internal tether extends in a direction at least substantially perpendicular to at least one of the longitudinal axes of the first and second supplemental inflation chambers.

13. The airbag cushion module of claim 12, wherein the longitudinal axes of the first and second supplemental inflation chambers extend in directions at least substantially parallel to each other.

14. The airbag cushion module of claim 8, wherein the internal tether comprises a plurality of internal tethers extending between the first supplemental inflation chamber and the second supplemental inflation chamber.

15. The airbag cushion module of claim 8, wherein the first supplemental inflation chamber is coupled to an exterior surface of the inflatable cushion, and wherein the second supplemental inflation chamber is coupled to the exterior surface of the inflatable cushion.

16. An airbag cushion assembly, comprising:
    an inflatable cushion configured to be deployed adjacent to a vehicle steering column to provide protection to a driver's knees during an impact event, wherein the inflatable cushion comprises:
      a front panel;
      a rear panel coupled with the front panel;
      a plurality of tethers extending between the front panel and the rear panel;
      a shroud portion having a thickness defined by the plurality of tethers, wherein the shroud portion is configured to deploy adjacent to a vehicle steering column shroud during deployment;
      a left knee portion configured to deploy from the shroud portion adjacent to a driver's left knee during deployment, wherein the left knee portion comprises a thickness greater than a thickness of the shroud portion; and
      a right knee portion configured to deploy from the shroud portion adjacent to a driver's right knee during deployment, wherein the right knee portion comprises a thickness greater than a thickness of the shroud portion such that the left knee portion and the right knee portion extend into regions to the left and right, respectively, of the vehicle steering column shroud, wherein the left knee portion comprises a first supplemental inflation chamber coupled to an exterior surface of a primary inflation chamber and fluidly coupled with the primary inflation chamber via a first inflation opening formed in a panel defining the primary inflation chamber; and wherein the right knee portion comprises a second supplemental inflation chamber coupled to the exterior surface of the primary inflation chamber and fluidly coupled with the primary inflation chamber via a second inflation opening formed in the panel defining the primary inflation chamber.

17. The airbag cushion assembly of claim 16, wherein the first supplemental inflation chamber is positioned external of the primary inflation chamber and is fluidly coupled with the primary inflation chamber via the first inflation opening, and wherein the second supplemental inflation chamber is positioned external of the primary inflation chamber and is fluidly coupled with the primary inflation chamber via the second inflation opening.

18. The airbag cushion assembly of claim 17, wherein the shroud portion is wholly defined by the primary inflation chamber, wherein the left knee portion is partially defined by the shroud portion and partially defined by the first supplemental inflation chamber, and wherein the right knee portion is partially defined by the shroud portion and partially defined by the second supplemental inflation chamber.

* * * * *